United States Patent [19]

Cooper et al.

[11] Patent Number: 4,462,270
[45] Date of Patent: Jul. 31, 1984

[54] FRICTION INDEX MODIFIER FOR DAMPER

[75] Inventors: Duncan H. Cooper; Herbert W. Egan, Jr., both of Indianapolis, Ind.

[73] Assignee: Wallace Murray Corporation, New York, N.Y.

[21] Appl. No.: 56,392

[22] Filed: Jul. 10, 1979

[51] Int. Cl.³ .................................................. F16F 15/10
[52] U.S. Cl. ............................................................ 74/574
[58] Field of Search ................ 74/574, 604; 64/1 V, 64/27 NM; 188/1 B; 123/192 B

[56] References Cited

U.S. PATENT DOCUMENTS

| | | | |
|---|---|---|---|
| 2,939,338 | 6/1960 | Troyer | 74/574 |
| 3,280,654 | 10/1966 | Arnt, Jr. | 74/574 |
| 3,440,899 | 4/1969 | McGavern et al. | 74/574 |
| 3,495,459 | 2/1970 | McLean | 74/574 |
| 3,495,475 | 2/1970 | Rumsey | 74/574 |
| 3,603,172 | 9/1971 | Hall | 74/574 |
| 3,641,839 | 2/1972 | Greeley | 74/574 |
| 3,678,782 | 7/1972 | Aoki | 74/574 |
| 3,771,380 | 11/1973 | Bahr et al. | 74/574 |
| 4,098,373 | 7/1978 | Troyer | 188/1 B |
| 4,200,004 | 4/1980 | Bremer, Jr. | 74/574 |

Primary Examiner—Kenneth Dorner
Attorney, Agent, or Firm—Thomas J. Greer, Jr.

[57] ABSTRACT

An improvement over U.S. Pat. No. 3,440,899 by McGavern. That patent includes a first plurality of shear liquid filled cavities defined by through apertures in the elastomer member. The improvement of this invention resides in adding a second plurality of shear liquid filled cavities, the cavities located in the inertia member at a surface thereof interfaced with the elastomer member. By this construction the total volume of shear liquid is increased, thereby increasing the damping action of the torsional vibration damper.

7 Claims, 5 Drawing Figures

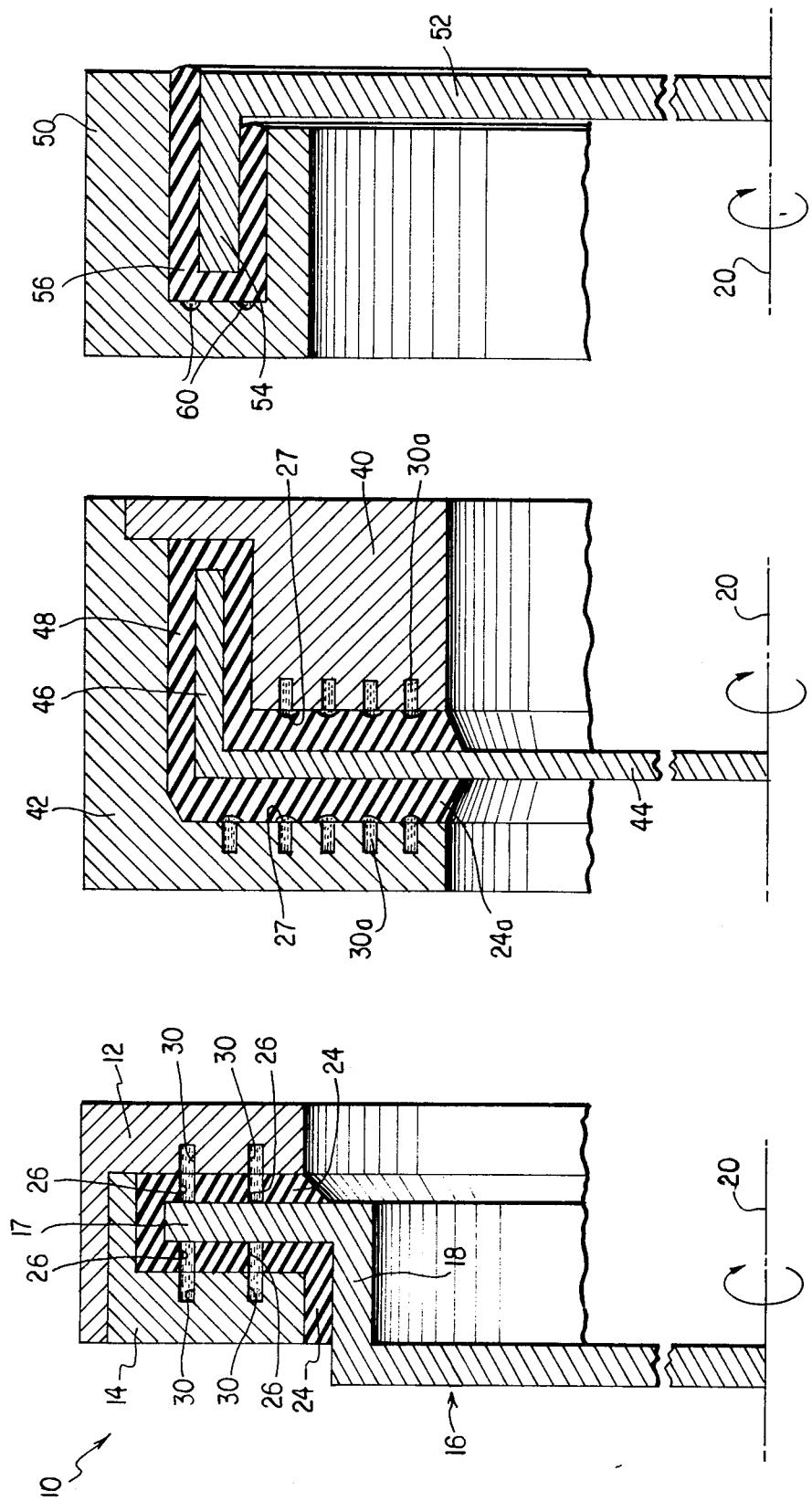

FRICTION INDEX MODIFIER FOR DAMPER

This invention relates to torsional vibration dampers of the type having a hub secured to an outer inertia member by an elastomer annulus.

The invention exhibits particular utility to the damping of torsional vibrations in internal combustion engines. Such dampers are generally classified at present in Class 74, sub-class 574 in the United States Patent Office. Torsional vibrations may be considered as back-and-forth twistings of the crankshaft of an internal combustion engine, superimposed upon the main, uni-directional rotation of the crankshaft. Unless controlled, such torsional vibrations will often lead to failure of the crankshaft, as well as contributing to failure in other parts of the engine or its cooling system, particularly where one of the resonant frequency modes of the crankshaft coincides with the particular firing frequency of the engine or a particular harmonic of that frequency. According to the present theory of elastomer vibration dampers, the torsional vibrational energy transmitted to the crankshaft by the action of the pistons is converted into heat in the elastomer. The elastomer may accordingly be considered as a drain or sump which continually receives a portion of the energy which causes torsional vibrations.

A common form of such a damping device includes an outer or inertia member in the form of a ring or annulus of some significant mass. The inner portion of this ring is attached to an elastomer annulus which, in turn, is secured to a hub or other element in turn attached to the rotating crankshaft of an engine. Both the hub and the inertia members may be of cast iron. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibrations in the shaft. In a typical instance of torsional vibration, an engine crankshaft turning at a rate of 3000 rpm simultaneously executed angular vibrations of an amplitude of from one-fourth degree to one degree at a frequency of 150 to 250 cycles per second.

The purpose of a torsional vibration damper is to reduce the amplitude of torsional vibrations. Such reduction lowers the strength requirements of the crankshaft and hence lowers the weight of the crankshaft. The damper has a direct effect on the crankshaft and also inhibits vibration of various other components of the internal combustion engine which are affected by crankshaft vibration.

As an internal combustion engine is operated at various engine speeds, several vibrational frequencies appear on the crankshaft. In general, most automotive and diesel engines of present design and not utilizing a torsional vibration damper have one fairly high amplitude resonant frequency within the engine operating range of speeds. However, at any given engine speed, torsional vibrations from various orders of vibration are present and can be significant.

In addition to elastomer damping, it is also known in this art to employ a viscous liquid to damp torsional vibrations. Typically, the viscous liquid is carried in an annular or other chamber within the inertia ring or member. Back and forth twistings of the crankshaft, i.e., torsional vibrations, cause turbulence in the viscous liquid. This turbulence, according to present theory, is converted into heat within the viscous liquid. Thus, the liquid functions in a manner similar to elastomer to reduce torsional vibrations. It is also known in this art to combine both elastomeric and viscous liquid damping, in a variety of constructions, in a single torsional vibration damper.

This invention is an improvement over the construction shown in U.S. Pat. No. 3,440,899 by McGavern. In that construction, both elastomer and viscous liquid damping are employed. This dual action is effected by providing a plurality of shear liquid filled cavities (termed a first plurality, for reasons which will soon become apparent) in the elastomer member. The improvement consists in providing a second plurality of shear liquid filled cavities, the second plurality located in the inertia ring at an interface thereof with the elastomer member. In one embodiment, each individual cavity in the second plurality is in alignment with a corresponding cavity of the first plurality. In this manner, the volume of shear liquid is increased (thus increasing the damping effect) while maintaining the same interface area between elastomer and inertia ring. In another embodiment, the individual cavities of the second plurality are not aligned with those of the first plurality, yet are also located in the inertia ring at an interface with the elastomer member.

IN THE DRAWINGS:

FIG. 1 is an upper, half-axial and longitudinal cross-section of a torsional vibration damper of this invention.

FIG. 2 is a view similar to FIG. 1 and illustrates an embodiment.

FIG. 3 is a view similar to FIG. 1 and illustrates yet another embodiment.

Figure 4:
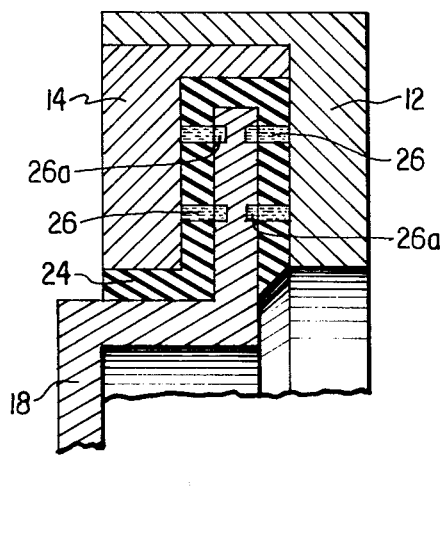
FIG. 4 is a partial view similar to FIG. 1 and illustrates a modification thereof.

Referring now to FIG. 1 of the drawings, the numeral 10 denotes a torsional vibration damper of the general type shown in U.S. Pat. No. 3,440,899 by McGavern, hereby incorporated by reference. The inertia ring is in two parts, one bearing the designation 12 and the other the designation 14. The numeral 16 denotes a generally disc shaped hub, here shown in the form of a web of generally uniform thickness and having an outermost radially extending portion 17, an intermediate axially extending portion 18, and a radially innermost extending portion 19. The hub 16 is adapted to be coupled to the crankshaft of an internal combustion engine and to be rotated about crankshaft axis 20. The manner of attaching the hub to the crankshaft is well known, and hence not illustrated. The numeral 24 denotes a continuous annular elastomer member positioned between the innermost portions of the two-part inertia ring and the outermost portion of the hub member 16, the elastomer member extending completely around the periphery of hub portions 17 and 18. Conventionally, an adhesive bond exists at both the hub-elastomer and the inertia ring-elastomer interfaces, so that the elastomer is bonded to both the inertia ring and the hub. Further, and also conventionally, the elastomer may be under compression, i.e., distortion due to compression on its face by inertia ring parts 12 and 14. The numeral 26 denotes any one of a plurality of angularly spaced through openings or apertures in the elastomer 24. The openings 26 extend completely around the circumference of the damper, and are also radially spaced from each other. These openings are filled with a viscous shear liquid and are accordingly entirely similar to the through openings 27 of FIG. 2 of the noted McGavern patent. The through openings or apertures 26 may be considered as a first plurality of cavities which contain silicone or other shear liquid of high viscosity.

According to the practice of this invention, a second plurality of cavities containing shear liquid operate to also provide liquid damping. The individual elements of this second plurality are denoted by the numeral 30 and are located in the inertia ring 12, 14 at interface portions with the elastomer. In the embodiment of the invention illustrated at FIG. 1, the cavities 30 are aligned with cavities 26, such that for each cavity 26 there is a corresponding cavity 30. The reader will now be in a position to comprehend that the additional cavities 30 serve to effectively increase the total volume of shear liquid in the torsional vibration damper 10, yet do not diminish the interface area between the elastomer 24 and the inertia ring 12, 14. Any diminution of the interface area would result in higher shear stresses at the interface, such higher shear stresses generally being undesirable. It will further be apparent that the volume of shear liquid has been increased without diminishing the volume of elastomer 24. As a general rule, it is desirable to maintain a maximum volume of elastomer in an elastomeric torsional vibration damper to thereby reduce unit volumeric shear stresses. The manner of assembly elements such as the inertia ring parts 12, 14, as well as the manner of placing the viscous liquid in the cavities is well known in the art and hence a description is not required.

Referring now to FIG. 2 of the drawings, another embodiment is illustrated. Here, the inertia ring is composed of two portions 40, 42 and the hub member is in the form of a radially extending web 44 having an axially extending portion 46 at its radially outermost periphery. The numeral 24a denotes an elastomer member of continuous circumferential extent similar to member 24 of the embodiment of FIG. 1, and includes a radially outermost, axially extending portion 48, which surrounds the outermost, axially extending portion 46 of the hub. The numeral 27 denotes any one of a plurality of angularly spaced cavities on the outer surfaces of elastomer portions 24a. These cavities define a first plurality of cavities and extend completely around the damper. The numeral 30a denotes any one of a second plurality of cavities, the latter positioned in the inertia ring 40, 42 and being entirely similar to cavities 30 of the embodiment of FIG. 1. They also extend around the circumference of the damper. The reader will observe that each cavity 27 in elastomer member 24a is aligned with a respective cavity 30a in the inertia ring 40, 42. Again, the manner of assembling elements such as those of the damper of FIG. 2 is known in the art.

The adhesive bond, above noted, between the elastomer-hub interface and the elastomer-inertia ring interface exists at the axially extending regions of the damper, i.e., 18 of FIG. 1 and 46 of FIG. 2. This permits relative sliding movement of these interfaces at the radially extending regions of the damper, i.e., 17 of FIG. 1 and 44 of FIG. 2.

Referring now to FIG. 4 of the drawings a variation is shown of the embodiment of FIG. 1. Instead of providing additional cavities in the inertia ring 12, 14 as in FIG. 1, such additional cavities 26a are provided in the radially extending outermost portion at hub member 18.

Figure 5:
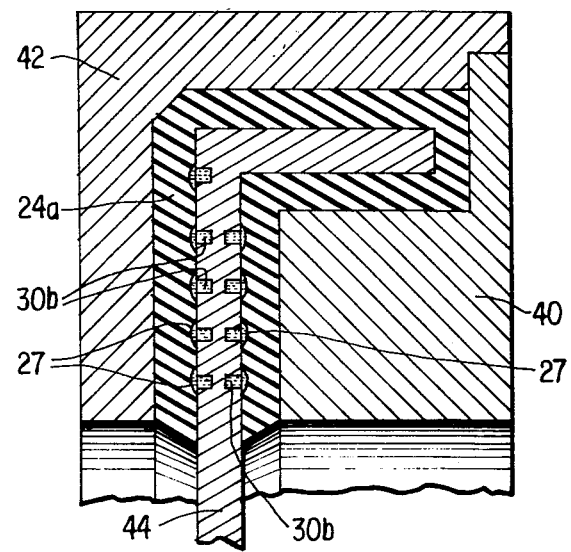
FIG. 5 is a partial view similar to FIG. 2 and illustrates a modification thereof.

FIG. 5 illustrates a similar modification of the embodiment of FIG. 2. The numeral 30b denotes the additional cavities, now placed in the radially extending portion of the hub 42. The elastomer cavities 27 are now located on the hub-elastomer interface, as shown at FIG. 5.

Referring now to FIG. 3 of the drawings, another embodiment of the invention is illustrated. Here, the inertia ring, denoted by the numeral 50, is of generally U-shape, with the U being placed on its side, and one leg, the radially outermost leg thereof, being thicker than the other leg. The numeral 52 denotes a radially extending hub having an axially extending portion 54 of continuous annular extent. The hub 52 is fixed by conventional means to the crankshaft of an internal combustion engine and rotates about crankshaft axis of rotation 20. The numeral 56 denotes an elastomer member of generally U-shape in cross-section, lying on its side. Again, the reader will understand that the elastomer member is of continuous annular or circumferential form. The numeral 60 denotes any one of a plurality of angularly spaced and radially spaced cavities formed in inertia ring 50 at the radially extending inertia ring-elastomer interface. The cavities 60 contain a viscous damping liquid such as a silicone liquid. The right hand side of the damper, as illustrated at FIG. 3, faces toward the engine, and thus the usual radiator cooling fan is to the left of the damper. By virtue of the configuration of inertia ring 50, the bight portion of the U-shaped inertia ring (in the shown axial and longitudinal cross-section) is directed toward the radiator cooling fan (not illustrated) and accordingly the elastomer member 56 enjoys a degree of protection from any abrasives which may be blown toward the torsional vibration damper through the engine cooling fan. This feature is especially effective in a sandy soil environment when the damper is used on a farm tractor.

In the embodiment of FIG. 3, the cavities which contain the damping viscous liquid are on a surface of the inertia ring. No cavity is in the elastomer or the hub.

It is claimed:

1. A torsional vibration damper of the type having a hub, an inertia ring, an elastomer member coupling the inertia ring to the hub, the hub adapted to be coupled to the crankshaft of an internal combustion engine, the elastomer member positioned between a portion of the hub and a portion of the inertia member and thereby both separating them and rotationally coupling them together, a first plurality of cavities in the elastomer member at a surface portion thereof, the cavities being filled with a viscous shear liquid, the improvement comprising, a second plurality of cavities, said second plurality of cavities also filled with a viscous shear liquid, the second plurality of cavities being in the inertia ring and located at an inertia ring-elastomer interface, whereby the total volume of viscous liquid carried by the damper is increased by the volume of the second plurality of cavities, each cavity of the second plurality of cavities being aligned with a corresponding cavity of the first plurality of cavities, whereby the total volume of shear liquid is increased without decreasing the interface area between the elastomer and the inertia ring.

2. The torsional vibration damper of claim 1 wherein the cavities of the said first plurality extend completely through the elastomer, to thereby form through openings in the elastomer.

3. The torsional vibration damper of claim 1 wherein the cavities of the first plurality are of a depth less than the thickness of the elastomer.

4. A torsional vibration damper of the type having a hub element, an inertia ring element, and an elastomer member coupling the inertia ring to the hub, the hub adapted to be coupled to the crankshaft of an internal combustion engine, the elastomer member positioned between a portion of the hub and a portion of the inertia member and thereby both separating them and rotationally coupling them together, a first plurality of cavities in the elastomer member at a surface portion thereof, the cavities being filled with a viscous shear liquid, the improvement comprising, a second plurality of cavities being in the one of said hub and inertia ring elements and located at an elastomer interface with one of said hub and inertia ring elements, and whereby the total volume of viscous liquid carried by the damper is increased by the volume of the second plurality of cavities, each cavity of the second pulrality of cavities being aligned with a corresponding cavity of the first plurality of cavities, whereby the total volume of shear liquid is increased without decreasing the interface area between the elastomer and the inertia ring.

5. The torsional vibration damper of claim 4 wherein the cavities of the said first plurality extend completely through the elastomer, to thereby form through openings in the elastomer.

6. The torsional vibration damper of claim 4 wherein the cavities of the first plurality are of a depth less than the thickness of the elastomer.

7. A torsional vibration damper of the type having a hub, an inertia ring, and an elastomer member coupling the inertia ring to the hub, the hub adapted to be coupled to the crankshaft of an internal combustion engine, the elastomer member positioned between a portion of the hub and a portion of the inertia member and thereby both separating them and rotationally coupling them together, the improvement comprising, a plurality of cavities in the inertia ring, said cavities being filled with a viscous shear liquid, said cavities located at an inertia ring-elastomer interface, whereby viscous liquid may be carried by the damper without diminishing the elastomer volume.

* * * * *